United States Patent [19]
Kobayashi

[11] Patent Number: 5,653,513
[45] Date of Patent: Aug. 5, 1997

[54] DUAL CIRCUIT LOAD-CONSCIOUS-TYPE HYDRAULIC PRESSURE CONTROL VALVE APPARATUS

[75] Inventor: Yasushi Kobayashi, Nagoya, Japan

[73] Assignee: Nisshinbo Industries, Inc., Tokyo, Japan

[21] Appl. No.: 607,492

[22] Filed: Feb. 27, 1996

[30] Foreign Application Priority Data

Feb. 27, 1995 [JP] Japan .................... 7-038083

[51] Int. Cl.⁶ ........................................ B60T 8/26
[52] U.S. Cl. .............................. 303/22.8; 188/195
[58] Field of Search ................. 303/9.69, 22.1, 303/22.8, 22.7, 22.4, 22.6; 188/195, 349

[56] References Cited

U.S. PATENT DOCUMENTS

| | | | |
|---|---|---|---|
| 3,731,981 | 5/1973 | Bueler | 303/22.1 |
| 3,977,735 | 8/1976 | Bush et al. | 303/22.7 |
| 4,101,176 | 7/1978 | Carre et al. | 188/195 |
| 4,332,423 | 6/1982 | Schopper et al. | 303/22.7 |
| 4,623,200 | 11/1986 | Ando et al. | 303/22.8 |
| 4,750,786 | 6/1988 | Adachi et al. | 303/22.1 |
| 5,246,277 | 9/1993 | Yamakoshi | 303/9.69 |

FOREIGN PATENT DOCUMENTS

| | | | |
|---|---|---|---|
| 0076567 | 4/1983 | European Pat. Off. | 303/9.69 |
| 0175452 | 10/1982 | Japan | 303/9.69 |

Primary Examiner—Douglas C. Butler
Attorney, Agent, or Firm—Young & Thompson

[57] ABSTRACT

A dual circuit load-conscious-type hydraulic pressure control valve apparatus for a dual circuit brake system of a vehicle, which is installed between a master cylinder and a brake cylinder, which apparatus includes a housing having two hydraulic channels in connection with the master cylinder and the brake cylinder, pair of hydraulic pressure control valves, a pair of plungers, a displacement transmission member for pushing the plungers according to the load responsive displacement of a suspension spring, an equalizer for transferring the force from the displacement transmission member to the pair of hydraulic pressure control valves by pushing the plungers, a supporting shaft to which an end of the displacement transmission member is pivoted so as to transmit the movement of the displacement transmission member to the equalizer, and a return spring, disposed between the equalizer and the displacement transmission member, for detaching the equalizer from the displacement transmission member in the direction of the longitudinal axis of the plungers, thereby preventing the equalizer from being dislocated, even when a full rebound or rear lift occurs, and improving the characteristics of the reaction to the hydraulic pressure.

4 Claims, 5 Drawing Sheets

FIG_3
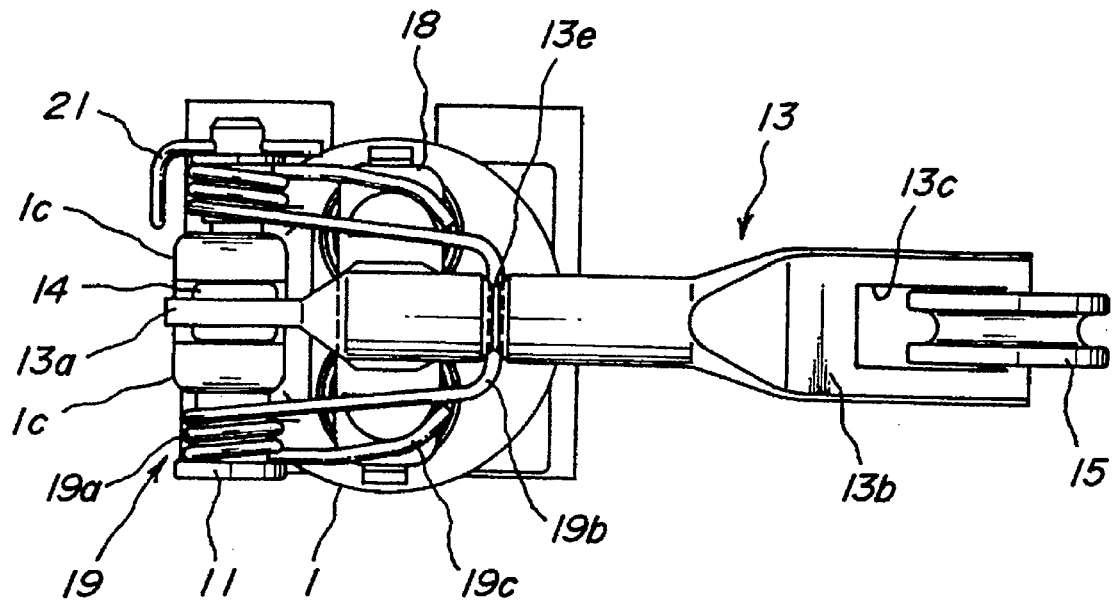
FIG_4
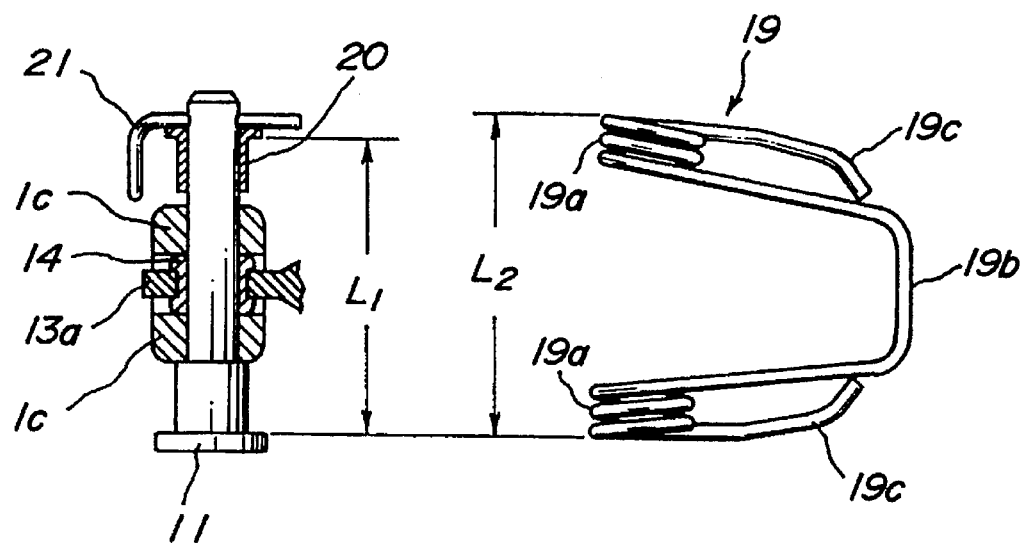

FIG_5
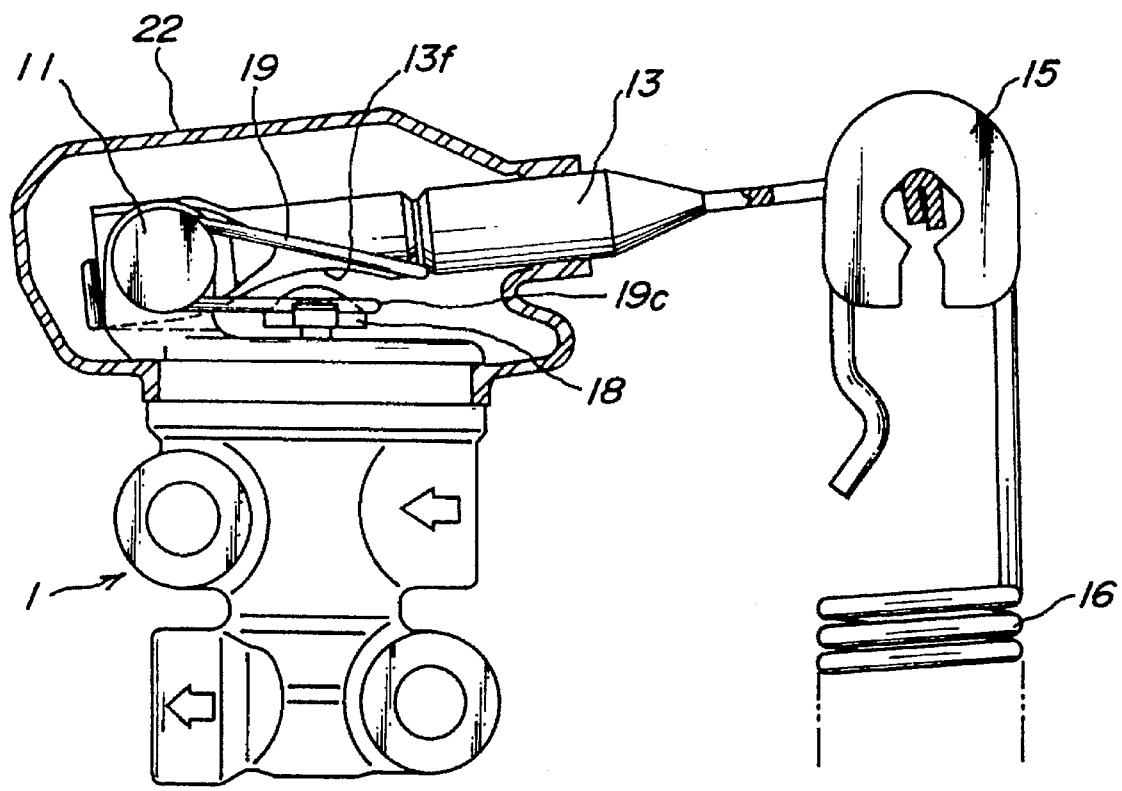

DUAL CIRCUIT LOAD-CONSCIOUS-TYPE HYDRAULIC PRESSURE CONTROL VALVE APPARATUS

BACKGROUND OF THE INVENTION

1. Field of the Invention

This invention relates to a dual circuit load-conscious-type hydraulic pressure control valve apparatus, and particularly to that for adjusting in a stable manner the liquid output pressure in a master cylinder used in a brake system of a vehicle, at a given ratio based on the load of the vehicle, even when the wheels are laden to rebound.

2. Description of Related Art

A hydraulically pressure control valve apparatus of this type, which is installed in a hydraulic channel between a master cylinder of a brake system and a brake cylinder of the rear wheels, exerts braking force equally on the front wheels and the rear wheels when the required braking force is low at the start of braking, while exerting lower braking force on the rear wheels than on the front wheels when the required braking force is over a given level, thereby preventing locking of the rear wheels. In vehicles having high load capacity, such as trucks, since the braking force which causes locking of the wheels varies depending on the load, the apparatus is adapted for controlling the cut-in pressure which triggers reduction of braking force in the rear wheels in such a way that the cut-in pressure is increased when the load is high while it is decreased when the load is low.

For example, heretofore, by using a pair of plungers, each independently controlled by the hydraulic pressure provided by a master cylinder in a brake system, respective valves are opened and closed, thereby reducing the hydraulic pressure at a given ratio, and transferring the pressure to each brake cylinder of the left and right rear wheels. This conventional mechanism is disclosed, for example, in U.S. Pat. No. 5,246,277 to Yamakoshi.

However, the load-conscious hydraulic pressure-controlling braking device disclosed in the Yamakoshi reference has the following drawbacks:

1) A clamping member for affixing an equalizer to a load detection lever at a given location is required, in order to prevent the equalizer from being dislocated when the load detection lever moves widely. Further, assembling of the braking device is complicated.

2) A rattling noise is generated due to gaps between the clamping member, the load detection lever, and the equalizer. Frictional wear is also generated due to vibration of these members.

3) In the case of circuit malfunctions, braking force becomes insufficient because the cut-in pressure in the other normal circuit remains the same.

4) The rear wheels are lifted up, so-called rear lift, as a result of the load moving towards the front wheel when the brakes are applied so fast, whereby the load transmission spring is freed from the load, and accordingly the detection lever is freed from the load. In reaction, the detection lever pushes a plunger for an instant, thereby destabilizing the characteristics of response to liquid pressure.

SUMMARY OF THE INVENTION

The present invention has exploited a dual circuit load-conscious-type hydraulic pressure control valve apparatus. An objective of the present invention is to provide an apparatus which is easily assembled, and allows for stabilizing the characteristics of response to the hydraulic pressure responsive to the load of a vehicle and the braking force, even after a full rebound or rear lift occurs.

Another objective of the present invention is to provide an apparatus which allows for compensation for reduction of braking force when one of the dual hydraulic circuits malfunctions.

One important aspect of the present invention is a dual circuit load-conscious-type hydraulic pressure controlling valve apparatus for a dual circuit brake system of a vehicle, comprising: (a) a housing adapted for being affixed to a suspension spring of a vehicle, comprising two hydraulic channels juxtaposed, each having an inlet for connecting a master cylinder of a brake system of the vehicle, and an outlet for connecting a brake cylinder of the brake system through which the hydraulic pressure generated in the master cylinder of the brake system is transferred to the brake cylinder of the brake system, when said housing is affixed to the suspension spring; (b) a pair of hydraulic pressure control valves provided in said respective hydraulic channels in said housing, each valve controlling the hydraulic pressure output in each hydraulic channel; (c) a pair of plungers connecting said respective hydraulic pressure control valves, each plunger having two ends and being plunged into each hydraulic channel in such a way that the first end having said valve is disposed inside said hydraulic channel and the second end is projected from said housing; (d) a displacement transmission member for detecting the relative displacement of the upper and lower parts of said suspension spring, said displacement being responsive to the load of the vehicle, and for exerting pressure on said pair of hydraulic pressure control valves based on the degree of the detected displacement; (e) an equalizer for transferring the pressure from said displacement transmission member to said pair of hydraulic pressure control vales by pushing said plungers in the direction of the longitudinal axis of said plungers, said equalizer being attached to both of said second ends of said plungers; (f) a supporting shaft to which an end of said displacement transmission member is pivoted so as to transmit the movement of said displacement transmission member to said equalizer by pivoting upon said supporting shaft to push said equalizer; and (g) a return spring for detaching said equalizer from said displacement transmission member in the direction of the longitudinal axis of said plungers, said return spring being disposed between said equalizer and said displacement transmission member.

In the above apparatus, by using the return spring which connects to the displacement transmission member and the equalizer so as to detach the equalizer from the displacement transmission member in the direction of the longitudinal axis of the plungers, it is possible to prevent the equalizer from being dislocated without the use of specific parts to affix the equalizer to the displacement transmission member. Further, even when a full rebound or rear lift occurs, the pressure to detach the equalizer and the displacement transmission member is exerted by the return spring, thereby preventing the equalizer from moving widely and from being dislocated. The displacement transmission member does not push the plungers in reaction, thereby improving the characteristics of the reaction to the hydraulic pressure. In addition, since pressure is continuously exerted on the plungers, due to the torsional force of the return spring, in such a direction as to open the valves, a conventional inner coil spring, which is placed around the circumference of each plunger in order to exert pressure on the plunger in such a direction as to open the valve, can be eliminated. Further, the simple structure is likely to prevent improper assembly and omission of parts, thereby improving assembly operation.

In the above apparatus, the return spring is preferably a coil spring placed around the supporting shaft, in which apparatus the coil spring has two projecting portions, one being attached to the displacement transmission member, the other being attached to the equalizer. Since the spring is placed around the support shaft and exerts pressure on the displacement transmission member and the equalizer to detach from each other, the spring does not rattle in the direction of the diameter of the supporting shaft. Further, when the coil spring is installed in the supporting shaft with compression of the coil spring in the direction of the spirals, the spring does not rattle in the direction of the longitudinal axis, thereby preventing rattling noise and vibration, resulting in prevention of frictional wear.

In the aforesaid apparatus, in order to accurately detect the displacement of the suspension spring in response to the load, the displacement transmission member is preferably comprised of a transmission lever and a transmission spring, in which the transmission lever is pivoted to the supporting shaft, the non-pivoted end of the transmission lever is connected to an end of the transmission spring, and the other end of the transmission spring has a bushing adapted for a suspension system of the vehicle.

Another important aspect of the above dual circuit load-conscious-type hydraulic pressure control valve apparatus is the structure, in which the displacement transmission member is positioned on the equalizer at the midpoint of the pair of plungers, in which structure the equalizer is in contact with the second ends of the pair of plungers at an angle approximately perpendicular to the longitudinal axis of the plungers. By employing the above structure, even when one of the dual hydraulic circuits malfunctions, the cut-in pressure in the other normal circuit will rise, thereby compensating for reduction of the liquid pressure.

BRIEF DESCRIPTION OF THE DRAWINGS

FIG. 3 is a schematic plan view of the apparatus shown in FIG. 1, in which the dust boot is removed;

FIG. 4 is a schematic plan view of the support shaft and the return spring shown in FIG. 3, in which they are detached to show their sizes prior to assembling;

FIG. 5 is a schematic side view of the apparatus shown in FIG. 1, which shows the functions of the apparatus.

DETAILED DESCRIPTION OF THE PREFERRED EMBODIMENTS

Figure 1:
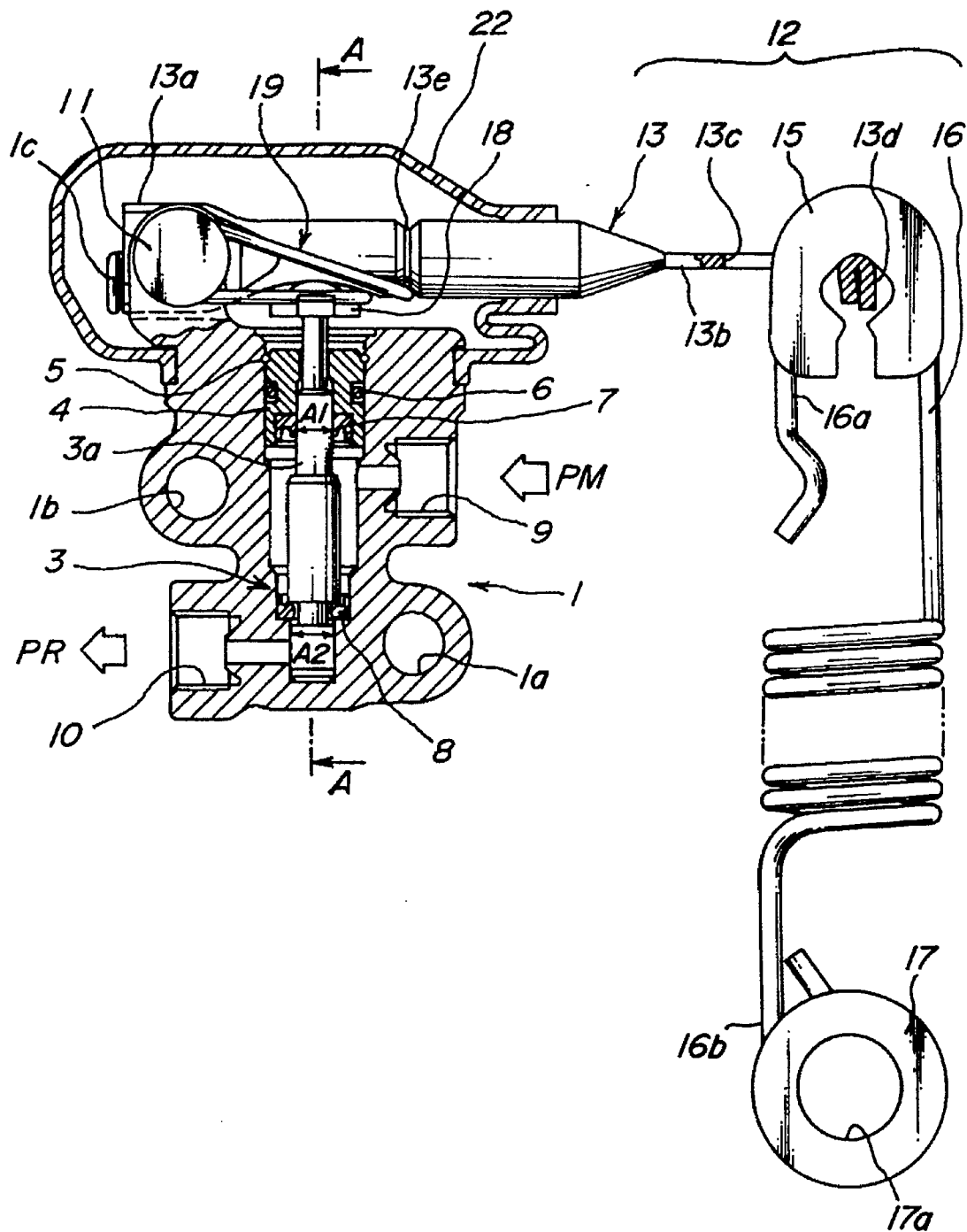
FIG. 1 is a partially sectional schematic side view showing an embodiment of the apparatus of the present invention.

The preferred embodiment of the present invention is discussed in the following in reference to the drawings. In FIG. 1, reference numeral 1 is a housing. Reference numerals 1a and 1b are mounting holes which mount the housing 1 either on an upper or lower side of a suspension spring of a vehicle (upper side of the suspension spring in this embodiment). In the housing 1, a pair of hydraulic pressure control valves 2 and 3 control the dual hydraulic pressure. Reference numerals 2a and 3a are a pair of plungers of the hydraulic pressure control valves 2 and 3. The plungers 2a and 3a have cylindrical portions $A_1$ and $A_2$ respectively, wherein $A_1$ is smaller than $A_2$.

Reference numeral 4 is a holder for both of the hydraulic pressure control valves 2 and 3. Reference numeral 5 is a stopper. Reference numeral 6 is an O-ring. Reference numeral 7 is a cup seal and reference numeral 8 is a lip seal. Reference numeral 9 is an inlet provided in the housing 1 for the hydraulic pressure control valves 2 and 3. Reference numeral 10 is an outlet.

In the upper side of the housing 1, a projecting forked bracket 1c is provided, wherein a support shaft 11 is inserted through the stopper 1c. Reference numeral 12 is a transmission member which applies a force to the hydraulic pressure control valves 2 and 3 when detecting the amount of the relative displacement of the upper and lower parts of the suspension spring, depending on the load of the vehicle. Reference numeral 13 is a lever of the transmission member 12. Both ends of the lever 13 are flattened, wherein each end is perpendicular to each other. A flat portion 13a of a base (left side of the hydraulic pressure control valve 3 appearing in FIGS. 1 and 3) is supported by the support shaft 11 of the bracket 1c through a bearing bushing 14 (FIG. 14).

A flat portion 13b at the end of the lever 13 is arranged substantially horizontally. With a guide hole 13c, a stopper 13d formed at the end of the lever 13 is engaged with a U-shaped guide 15 having a groove made of resin. Further, one end 16a of a spring 16 is engaged with the guide 15. The other end 16b of the spring 16 is wound in a bushing 17. A lower end of the spring 16 is further connected to, for example, a bushing below the suspension spring of the suspension system of the vehicle (not shown) through a hole 17a of the bushing 17.

In the middle of the lever 13, a notch 13e having a ring-shaped groove for engaging a first engaging portion of a return spring (described later), and a contact part 13f for contacting an upper surface of an equalizer (described later), are formed. The bottom of the contact part 13f is perpendicular with to an axial direction of the both plungers 2a and 3a, as shown in the cross-sectional view of FIG. 2. As shown in FIG. 5, the contact part 13f is dented in a longitudinal direction of the lever 13. Further, it is not always necessary to have the notch 13e because the first engaging portion of the return spring is engaged at the lower part of the lever 13.

Figure 2:
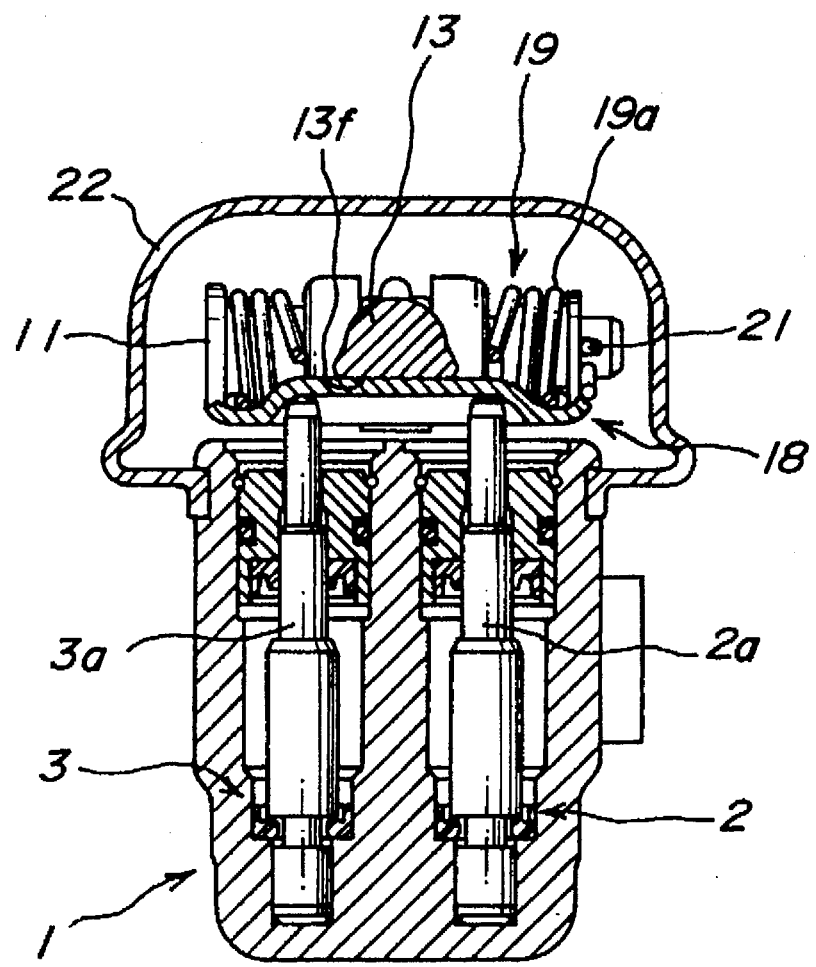
FIG. 2 is a schematic sectional view of the apparatus taken along line A—A in FIG. 1.
Figure 6:
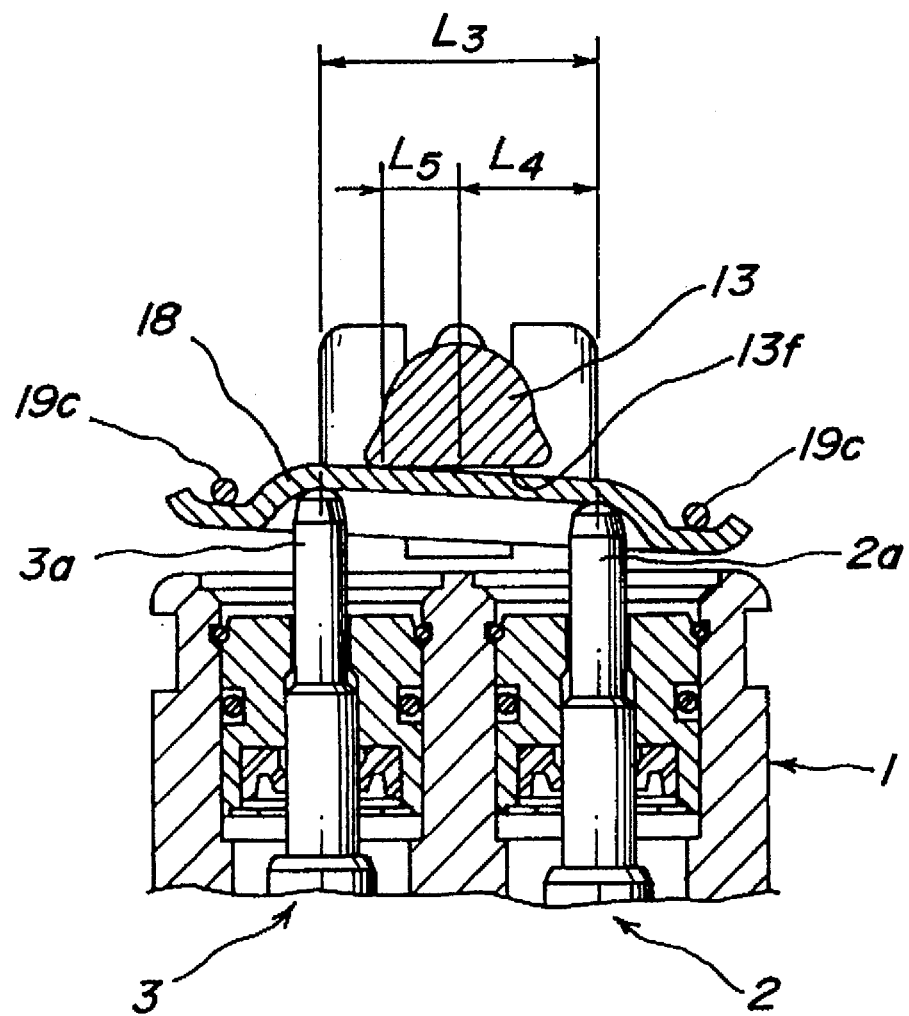
FIG. 6 is a schematic sectional front view of the apparatus shown in FIG. 1, which shows the functions of the apparatus.

As shown in FIGS. 2 and 6, an equalizer 18, shaped like the bottom of an upside down hull, is mounted on a projected end of the plungers 2a and 3a. As shown in FIG. 4, the return spring 19 has coil portions 19a on both ends. A spring part extending from one end of each coil portion 19a to the outer periphery direction forms a first engaging portion 19b. The other ends of the coil portion 19a are respectively extended so as to form second engaging portions 19c. The second engaging portions 19c are in contact with the end portions of the equalizer 18, which end portions are outside the point of contact with each upper end of the plungers 2a and 3a, wherein the equalizer 18 is pushed by the upper ends of the plungers 2a and 3a. As shown in FIG. 4, a length $L_2$ from one end to the other end of the coil portions 19a of the return spring 19 is arranged to be larger than a length $L_1$ from the support shaft 11 to a sleeve 20. Further, when the support shaft 11 is inserted to the coil portions 19a, the spring 19 is pressed in the axial direction of the support shaft 11. The coil portions 19a of the return spring 19 located between the first and second engaging portions 19b and 19c work as the torsion springs, allowing a spacing between the leer 13 and equalizer 18 in an axial direction of the plungers 2a and 3a, as shown in FIG. 5. In FIGS. 2–4, reference numeral 21 is a stopper pin inserted in the support shaft 11. In FIGS. 1, 2 and 5, reference numeral 22 is a dust boot covering the upper part of the housing 1, lever 13 and return spring 19.

As described above, the transmission member 12, which is comprised of the lever 13, the guide 15, the spring 16 and the bush 17, is mounted between the upper and lower sides of the suspension spring of a vehicle. Although this embodiment adopts an extension coil spring as the spring 16 of the transmission member 12, it is also possible to utilize a compression coil spring. Moreover, the lever 13 can be made from an elastic member such as a plate or bar spring instead of the spring 16. In other words, other structures are acceptable as long as the pressure depending on the loading weight is applied to the hydraulic pressure control valve by detecting the degree of displacement of the upper and lower parts of the suspension spring.

In this embodiment, the return spring 19 is composed of coil portions 19a, a first engaging portion 19b, and second engaging portions 19c. The coil portions 19a are provided in both sides of the spring 19. The first engaging portion 19b is formed between the coil portions 19a. The second engaging portions 19c are extended from the outward ends of the coil portions 19a. However, this arrangement is only illustrative and not intended to limit the scope of the present invention. For instance, a coil portion can be formed in the center, and first and second engaging portions can be formed at the respective outward ends of the coil by extending the ends. Furthermore, instead of using a wire coil spring, a wound plate spring can be utilized. The main purpose is that the transmission member 12 and the equalizer 18 are kept apart in the axial direction of the plungers by means of the return spring 19, as a torsion spring.

The operation of the apparatus of this embodiment is described in the following. The housing 1 is mounted on either the upper or lower side of the suspension spring of the vehicle, wherein the spring 16 is mounted on the opposite side. The relative position of the upper and lower parts of the suspension spring changes depending on the load weight or driving condition (bound or rebound) of a vehicle. The lever 13 of the transmission member 12 and the spring 16 detects the degree of displacement between the upper and lower parts of the suspension spring.

Particularly, when the load weight is heavy and the vehicle is in a bound state, the position of the mounting hole 17a, of the spring 16 is lowered, relative to the housing 1 as in FIG. 1. The spring 16 is further extended so that more force is applied to the plungers 2a and 3a by the lever 13. Thus, the resistance of the plungers 2a and 3a to the valve-closing (upward) direction is increased, resulting in an increase in the cut-in pressure. When the load weight is light and the vehicle is in a rebound state, less force is applied to the plungers 2a and 3a by the lever, and the resistance of the plungers 2a and 3a to the valve-closing (upward) direction is decreased, resulting in an decrease in the cut-in pressure.

During normal operation, the lever 13 is position in the center of the plungers 2a and 3a. Thus, the pressure exerted by the lever 13 is equally applied to each of the plungers 2a and 3a. Namely, the hydraulic pressure PR form the outlet 10 is equally transmitted to both rear brakes. When the hydraulic pressure reaches a predetermined value, the rear hydraulic pressure PR is reduced at a predetermined gradient, in a conventional manner, relative to a master cylinder hydraulic pressure PM. Conventionally, an inner spring wound in the outer periphery of the plungers for pressing the plungers to the valve-open direction (downward direction in FIG. 1) has been utilized. However, in this embodiment, the second engaging portion 19c presses the plungers 2a and 3a in the valve-opening direction by the torsional force of the return spring 19.

Furthermore, if the degree of displacement between the vehicle body (upper side of the suspension spring) and an axle shaft (lower side of the suspension spring) reaches the maximum when a vehicle is in a rebound state (which may be caused by bouncing of a vehicle on a rough road surface or jacked up of a vehicle), or in a rear-lift state in which rear wheels of a vehicle are lifted (which may be caused by transferring of a wheel load to front wheels of the vehicle due to a spike stop of the vehicle with a light load weight) ,the contact part 13f of the lever 13 separates from the equalizer 18, as shown in FIG. 5. In this case, since the second engaging portion 19c of the return spring 19 is in contact with the equalizer 18 so as to press the ends of the plungers 2a and 3a, the equalizer 18 is unlikely to be dislocated. Moreover, since the first engaging portion 19b of the return spring 19 is in contact with the lever 13, the lever 13 is unlikely to be freed. Thus, the plungers 2a and 3a are unlikely to be pressed in reaction to the lever 13.

FIG. 6 illustrates the mode of operation when one of the two brake systems fails. FIG. 6 shows a state where the right hydraulic pressure control valve 2 fails while the left hydraulic pressure control valve 3 operates normally. As a result, there is insufficient braking force. Namely, the braking force is decreased by half of the normal operation, especially in a diagonal brake split structure such as that shown in this embodiment. Thus, the insufficient braking force should be compensated by raising the cut-in pressure associated with the rear wheels. In particular, the cut-in pressure is raised by increasing the pressure on the left plunger 3a. While the plunger 2a does not move because there is no hydraulic pressure applied to the right side hydraulic control valve 2, the left plunger 3a is moved in the valve-closing (upward) direction as shown in FIG. 6, when the hydraulic pressure reaches a predetermined value. The equalizer 18 is then pushed on the left side and inclined so as to push the left edge of the contact part 13f of the lever 13. With respect to the entire pressure exerted by the lever 13, the force applied on the left plunger 3a is $(L_4+L_5)/L_3$ which is larger than the normal force $L_4/L_3(=\frac{1}{2})$, whereby the cut-in pressure is increased, i.e., it becomes more difficult to close the valve, thereby compensating for the malfunction of one of the two brake systems.

Due to the above structures, the following advantages can be realized:

1) By using the return spring 19 which connects to the lever 13 of the displacement transmission member 12 at the first engaging portion 19b, as well as the equalizer 18 at the second engaging portion 19c so as to detach the equalizers 2a and 3a from the displacement transmission member 12 in the direction of the longitudinal axis of the plungers, it is possible to prevent the equalizer 18 from being dislocated without the use of specific parts to affix the equalizer 18 to the displacement transmission member 12. Further, even when a full rebound or rear lift occurs, the pressure to detach the equalizer 18 and the displacement transmission member 12 is exerted by the return spring 19, thereby preventing the equalizer 18 from moving widely and from being dislocated. The displacement transmission member 12 does not bush the plungers 2a and 3a in reaction, thereby improving the characteristics of the reaction to the hydraulic pressure.

2) Since the return spring 19 is placed around the support shaft 11 and exerts pressure the displacement transmission member 12 and the equalizer to detach each other, the spring 19 does not rattle in the direction of the diameter of the supporting shaft 11. Further, when the return spring (coil spring) is installed in the supporting shaft 11 with compression of the coil spring in the direction of the spirals, the spring 19 does not rattle in the direction of the longitudinal axis, thereby preventing rattling noise and vibration, resulting in prevention of frictional wear.

3) Even when one of the dual hydraulic circuits malfunctions, the cut-in pressure of the other normal circuit will rise, thereby compensating for undesirable reduction of the hydraulic pressure.

4) Since pressure is continuously exerted on the plungers 2a and 3a, due to the torsional force of the return spring 19, in such a direction as to open the valves, a conventional inner coil spring which is placed around the circumference of each plunger in order to exert pressure on the plunger in such a direction as to open the valve, can be eliminated. Further, the simple structure is likely to prevent misassembly and omission of parts, thereby improving assembling operation.

I claim:

1. A dual circuit load-conscious-type hydraulic pressure control valve apparatus for a dual circuit brake system of a vehicle, comprising:

a housing adapted for being affixed to a suspension spring of a vehicle, comprising two hydraulic channels juxtaposed, each having an inlet for connecting a master cylinder of a brake system of the vehicle, and an outlet for connecting a brake cylinder of the brake system, through which the hydraulic pressure generated in the master cylinder of the brake system is transferred to the brake cylinder of the brake system, when said housing is affixed to the suspension spring;

a pair of hydraulic pressure control valves provided in said respective hydraulic channels in said housing, each valve controlling the hydraulic output pressure in each hydraulic channel;

a pair of plungers connecting said respective hydraulic pressure control valves, each plunger having two ends and being plunged into each hydraulic channel in such a way that the first end having said valve is disposed inside said hydraulic channel and the second end is projected from said housing;

a displacement transmission member for detecting the relative displacement of the upper and lower parts of said suspension spring, said displacement being responsive to the load of the vehicle, and for exerting pressure on said pair of hydraulic pressure control valves based on the degree of the detected displacement;

an equalizer for transferring the pressure from said displacement transmission member to said pair of hydraulic pressure control valves by pushing said plungers in the direction of the longitudinal axis of said plungers, said equalizer being attached to both of said second ends of said plungers;

a supporting shaft to which an end of said displacement transmission member is pivoted so as to transmit the movement of said displacement transmission member to said equalizer by pivoting upon said supporting shaft to push said equalizer; and a return spring for detaching said equalizer from said displacement transmission member in the direction of the longitudinal axis of said plungers, said return spring being disposed between said equalizer and said displacement transmission member.

2. The dual circuit load-conscious-type hydraulic pressure control valve apparatus according to claim 1, wherein said return spring is a coil spring placed around said supporting shaft, said coil spring having two projecting portions, one being attached to said displacement transmission member, the other being attached to said equalizer.

3. The dual circuit load-conscious-type hydraulic pressure control valve apparatus according to claim 1, wherein said displacement transmission member is comprised of a transmission lever and a transmission spring, in which said transmission lever is pivoted to said supporting shaft, the non-pivoted end of said transmission lever is connected to an end of said transmission spring, and the other end of said transmission spring has a bushing adapted for a suspension system of the vehicle.

4. The dual circuit load-conscious-type hydraulic pressure control valve apparatus according to claim 1, wherein said displacement transmission member is positioned on said equalizer at the middle of a space between said pair of plungers, in which said equalizer is in contact with said second ends of said pair of plungers at an angle approximately perpendicular to the longitudinal axis of said plungers.

* * * * *